Aug. 28, 1951  H. CARTMILL  2,565,909
SOLDERING IRON WITH REGULABLE SOLDER SUPPLY
Filed Oct. 6, 1949
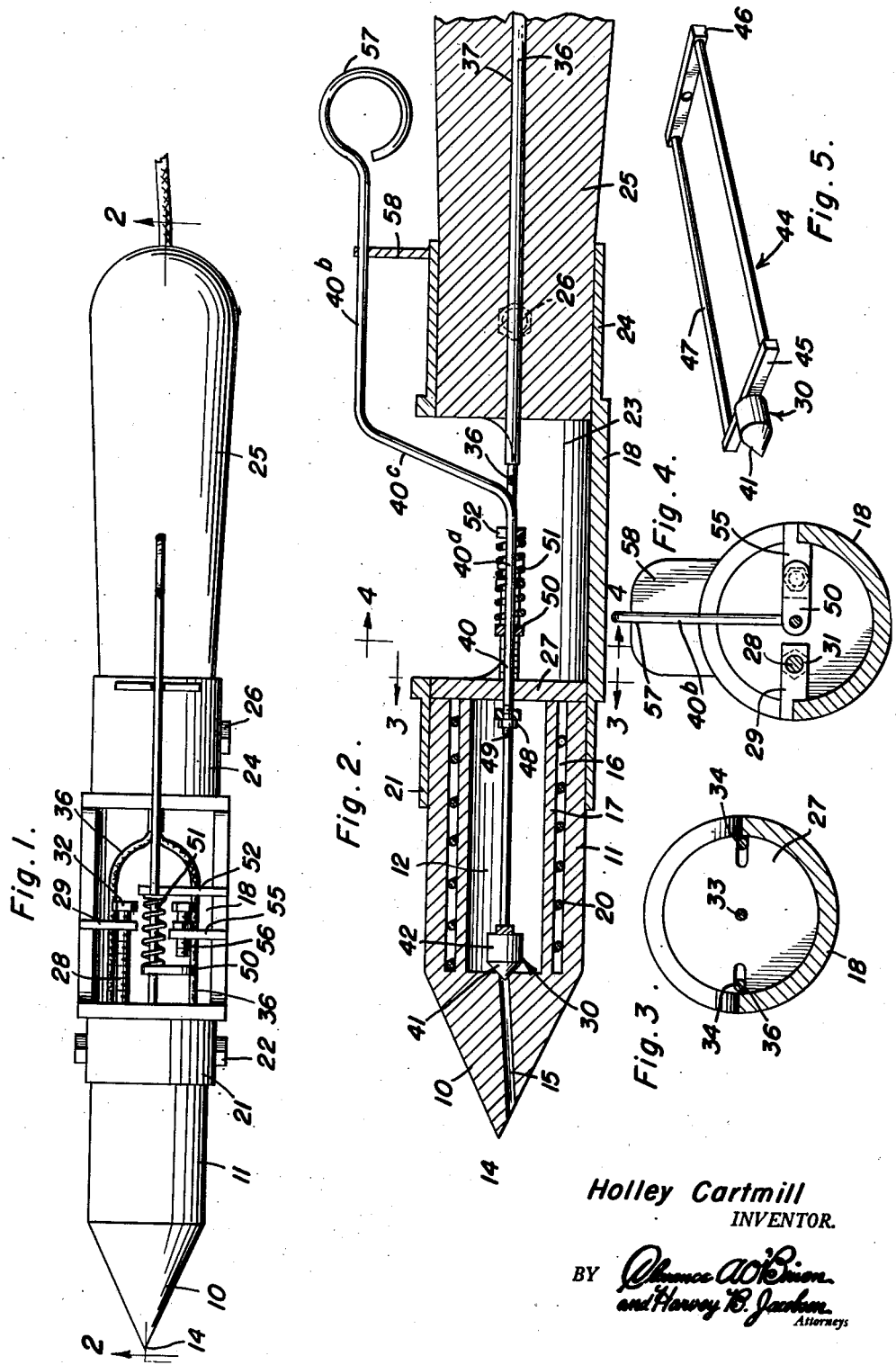
Holley Cartmill
INVENTOR.

Patented Aug. 28, 1951

2,565,909

UNITED STATES PATENT OFFICE 2,565,909

SOLDERING IRON WITH REGULABLE SOLDER SUPPLY

Holley Cartmill, San Bernardino, Calif.

Application October 6, 1949, Serial No. 119,899

4 Claims. (Cl. 219—27)

This invention relates to soldering irons and it has for its main object to provide means whereby a continuous supply of solder is available during operation from which easily regulable quantities of solder may be supplied to the bit of the soldering iron.

Another object of the invention is to provide simple and effective means for heating the solder within a reservoir provided in the soldering iron and for feeding the molten material to the bit of the soldering iron.

It is a further object of the invention to provide simple and effective means for producing the regulation of the supply of molten material and for manipulating the regulating means with one hand.

According to the invention, therefore, the solder is held in a double walled reservoir or compartment between the double walls of which the heating coil is inserted and supplied with current from without. This compartment or reservoir is provided at one end with a channel leading to a point near the bit of the soldering iron and said channel is controlled by a valve which can be manipulated from the outside. The manipulation is obtained by means of a lifting rod having an end arranged alongside the handle of the soldering iron and by means of a connecting frame holding the valve inside the heated chamber or compartment and connecting it with the lifting rod. This connecting frame consists of members which are arranged alongside the heated walls of the compartment so that any fixation of the valve due to the solidification of the solder will immediately cease as soon as the chamber is heated. The lifting rod is preferably provided with a centered axial section connected with the valve carrying frame and with an outwardly projecting section which is guided alongside the handle of the wall and which can therefore easily be manipulated by one finger of one hand.

Further objects of the invention and further features thereof will be apparent in the following detailed specification.

The invention is illustrated in the accompanying drawing showing one embodiment thereof by way of example. It is however to be understood that the modification of the invention which has been illustrated is an example permitting to explain the principle of the invention and the best mode of applying said principle. The drawing does not show all the modes of applying the principle and modifications of the embodiment shown and illustrated are therefore not necessarily departures from the essence of the invention.

In the drawing:

Figure 1 is an elevational side view of the soldering iron.

Figure 2 is a longitudinal section through the soldering iron along the plane of symmetry indicated by the line 2—2 of Figure 1.

Figure 3 is an elevational sectional view, the section being taken along line 3—3 of Figure 2.

Figure 4 is another elevational sectional view, the line being taken along line 4—4 of Figure 2.

Figure 5 is a perspective view of the valve and the connecting frame.

The soldering iron according to the invention comprises the soldering bit 10 which is solidary with or is attached to a receptacle 11 which forms the body portion of the soldering iron and which contains a reservoir for the solder in the form of a heating chamber 12 in which the solder is stored and heated. A channel 15 controlled in a manner described below leads from the compartment or chamber 12 to the outside of the bit, the outer orifice of the channel being preferably located slightly above the tip 14 of the bit 10.

The body portion 11 of the soldering iron which contains the reservoir or heating chamber is preferably provided with a double wall and a space 16 is left between the inner wall 17 and the outer wall of the body portion 11 which accommodates the heating coil 20 for heating the chamber 12 electrically.

The body portion 11 of the soldering iron is held within a shank or steel holder 18 which consists of three sections. One section is formed by a sleeve 21 for gripping and holding the body portion 11. A further section is formed by a half-cylindrical central portion 23 which joins the said sleeve 21 with a further cylindrical upper sleeve portion 24 holding the wooden handle 25 of the soldering iron.

The sleeve portion 21 of the shank 18 is attached to the body portion 11 by means of screw bolts 22, while the wooden handle 25 is preferably held within the sleeve portion 24 of the shank by means of a screw bolt 26.

The reservoir or receptacle 12 within the body portion 11 is preferably closed on all sides but is open at the top and may be closed on this side by a closing plate 27 which is held down by means of a threaded screw bolt 28 engaging a screw threaded bore 31 in a bracket 29 which projects from the wall of the half cylindrical portion of the shank 18. The screw bolt is provided with a head portion 32 by means of which the pressure of the screw bolt on the cover plate may be adjusted.

The cover plate 27 is provided with three bores 33, 34 two of them, 34, being provided in such a position that they will give access to the space 16 between the double walls of the body portion 11. Through these bores the connecting wires 36 for the electric heating coil 20 are inserted and are connected with the ends of the coil. The wires after leaving the bores 34 form a loop and are then joined so that they can pass through a central bore 37 of the wooden handle 25 to a connector of some kind which is not shown.

The central opening or bore 33 in the cover plate 27 gives passage to a lifting rod 40 for a valve 30 which controls the outflow of the solder when in a molten state from the chamber or compartment 12 through the channel 15.

The valve 30 may be provided with a conical valve seat 41 the pointed part of which enters the channel and may close it completely when pressed against the walls of the orifice of the same. When lifted, the valve permits a flow of molten solder material through the channel to an extent which corresponds to the lifting of the valve by means of the lifting rod 40.

The valve lifting rod 40 is connected with the valve 30 by means of a lifting frame 44 which consists of two crossbars 45, 46 joined by two spaced longitudinal rods 47. These rods are located in the immediate vicinity of the walls of the chamber and are thereby heated as soon as the electric soldering iron has started to operate.

The valve 30 is fastened to one of the crossbars 45, while the lifting rod 40 is secured to the other crossbar 46 by means of a nut 48 engaging the threaded end 49 of the lifting rod 40 which passes through the central bore 33 of the cover plate 27.

The lifting rod is bent as will be seen in Figure 2 and therefore has two parallel sections 40a and 40b joined by an inclined bent section 40c. The end section 40b is thus brought into a position in which it may be shifted alongside the handle 25. The central or inner section 40a of the lifting rod is provided with a bracket 50 soldered or welded to it which serves as a spring retainer and as a stop. The spring 51 presses against this bracket which spring, on its other end, is held against a bracket 52 fixedly connected with the wall of the half-cylindrical section 23 of the shank 18. It will thus be understood that the lifting rod is pressed down by the spring 51 which exerts pressure against the retainer and stop bracket 50 so that the rod can only be lifted by compressing the spring 51 which then presses against the bracket 52.

A third bracket 55, fixedly mounted on the open half-cylindrical section 23 holds a stop screw 56 against which the bracket 50 abuts when lifted to the maximum permissible extent. This extent, as will be readily understood, is adjustable by adjusting the screw 56 within the bracket 55.

The outwardly projecting end 40b of the lifting rod 40 is provided with a finger piece 57 in the form of a ring by means of which it may be easily seized and lifted by one finger of one hand. This portion of the lifting rod is guided in the bore of a guide piece 58 which is solidary with and projects from the sleeve portion 24 holding the handle 25.

The manner in which the soldering iron is operated will be readily understood from the foregoing description. The compartment 12 is filled with suitable soldering material and the wires 36 are connected with an outlet so as to heat the chamber 12 and the solder which has been placed into it until it melts. When the soldering iron has thus been heated it may now be used in the customary manner, as the bit 10 has been heated along with the chamber 12. The lifting rod 40 may either be lifted for a short time in order to deposit a drop of solder or may be held while lifted for some time, if a band or ribbon of liquid solder is to be deposited. The liquid solder runs through the channel 15 to the tip of the bit 10 in the desired quantity which may be regulated by the use of the lifting rod. When the lifting rod is released the valve by virtue of the spring pressure and of its conical seat slips automatically back into its sealing position.

It will be clear that changes in the unessential elements above described will not affect the essence of the invention which is defined by the annexed claims.

Having described the invention, what is claimed as new is:

1. An electric soldering iron comprising a substantially cylindrical body portion provided at one end with a bit forming one piece with said body portion, and enclosing a chamber open at the other end of the body portion forming a reservoir, a separate wall spaced from the outer walls of the body portion within said body portion surrounding said chamber, an electric heating coil arranged between the spaced walls of the chamber and of the body portion, a removable apertured cover plate for covering the open end of said chamber, a channel leading from said chamber to said bit, a shank member with spaced cylindrical sections and a half cylindrical section between them, said body portion being one of said cylindrical sections, means on the half cylindrical portion of said shank member for removably holding said cover plate against said body portion for closing said chamber, said means including a pressure screw applied against the said cover plate, a valve member within said chamber controlling the inlet opening of said channel in the chamber, a lifting frame structure carrying said valve member within said chamber and a spring pressed lifting rod, projecting outwardly from said chamber and having an axially movable central section connected with said frame structure and extending through the said chamber, through the apertured cover plate and through part of the half cylindrical section of the shank and an eccentric section carrying a finger piece arranged alongside of and movable along said handle for imparting an axial movement to the central lifting rod section.

2. An electric soldering iron comprising a substantially cylindrical body portion provided with a bit, and enclosing a chamber forming a reservoir, a separate wall spaced from the outer walls of the body portion within said body portion surrounding said chamber, an electric heating coil arranged between the spaced walls of the chamber and of the body portion, a removable cover plate for said chamber, a channel leading from said chamber to said bit, a substantially cylindrical shank member, carrying said body portion, means on said shank member for removably holding said cover plate against said body portion for closing the chamber, a valve member closing the inlet opening of the channel in the chamber, a frame structure within said chamber for carrying the valve member, a lifting rod attached to said frame structure having a central portion passing through said cover plate, and arranged in the axis of the cylindrical shank member and having a further portion parallel thereto arranged and movable along the handle, said latter portion being provided with a finger piece, spring means for holding said lifting rod in a position in which the valve closes the channel and a stop bracket on said lifting rod for limiting the stroke of the lifting rod.

3. An electric soldering iron comprising a substantially cylindrical body portion provided with a bit, and enclosing a chamber forming a reservoir, a separate wall spaced from the outer walls of the body portion within said body portion surrounding said chamber, an electric heating coil arranged between the spaced walls of the chamber and of the body portion, a removable cover plate for said chamber, a channel leading from said chamber to said bit, a shank member with spaced cylindrical sections and a half cylindrical section between them, one of said cylindrical sections of the shank member holding the body portion, a handle held by the other cylindrical section of the shank member, brackets carried by said half cylindrical section, one of said brackets holding a fastening means for the removable cover plate for the said chamber, a valve member closing the inlet opening of the channel in the chamber, a frame structure within said chamber for carrying the valve member, a lifting rod attached to said frame structure having a central portion passing through said cover plate arranged in the axis of the cylindrical shank member and having a further portion parallel thereto arranged and movable along the handle, said latter portion being provided with a finger piece, spring means for holding said lifting rod in a position in which the valve closes the channel, one of the brackets of the half cylindrical portion of the shank member forming a spring retainer and guide for the central lifting rod section, and a stop bracket on the lifting rod, forming a spring retainer on the latter and cooperating with one of the brackets of the half cylindrical portion to limit the movement of said rod.

4. An electric soldering iron comprising a substantially cylindrical body portion provided with a bit forming one piece with said body portion and enclosing a chamber forming a reservoir, electric heating means for said chamber, a channel leading from said chamber to said bit, a shank member for carrying said body portion and a handle carried by said shank member, a valve member within said chamber controlling the inlet opening of said channel in the chamber, a lifting frame structure carrying said valve member within said chamber, said lifting frame structure including transverse bars arranged along a diameter of the cylindrical chamber, one of them carrying the valve member, and longitudinal bars, joining said transverse bars and arranged in proximity to the walls of the chamber, and a spring pressed lifting rod, projecting outwardly from said chamber and having an axially movable central section connected with one of the transverse bars of said frame structure and an eccentric section carrying a finger piece arranged alongside of and movable along said handle for imparting an axial movement to the central lifting rod section.

HOLLEY CARTMILL.

REFERENCES CITED

The following references are of record in the file of this patent:

UNITED STATES PATENTS

| Number | Name | Date |
|---|---|---|
| 431,439 | Coffin | July 1, 1890 |
| 689,318 | Lee | Dec. 17, 1901 |
| 1,400,148 | Frum | Dec. 13, 1921 |
| 1,520,645 | Grevers et al. | Dec. 23, 1924 |
| 1,819,671 | Buccola | Aug. 18, 1931 |